(12) United States Patent
Lee et al.

(10) Patent No.: US 9,841,082 B2
(45) Date of Patent: Dec. 12, 2017

(54) PLANETARY GEAR TRAIN OF AUTOMATIC TRANSMISSION FOR A VEHICLE

(71) Applicant: Hyundai Motor Company, Seoul, KS (US)

(72) Inventors: Chang Wook Lee, Whasung-Si (KR); Sueng Ho Lee, Whasung-Si (KR); JongSool Park, Whasung-Si (KR); KyeongHun Lee, Whasung-Si (KR); Dong Hwan Hwang, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 127 days.

(21) Appl. No.: 14/927,281

(22) Filed: Oct. 29, 2015

(65) Prior Publication Data
US 2016/0356350 A1    Dec. 8, 2016

(30) Foreign Application Priority Data
Jun. 2, 2015    (KR) .................. 10-2015-0078001

(51) Int. Cl.
*F16H 37/06*    (2006.01)
*F16H 3/44*    (2006.01)
*F16H 3/62*    (2006.01)
*F16H 3/66*    (2006.01)

(52) U.S. Cl.
CPC .......... *F16H 3/66* (2013.01); *F16H 2003/445* (2013.01); *F16H 2200/0069* (2013.01); *F16H 2200/0086* (2013.01); *F16H 2200/2012* (2013.01); *F16H 2200/2048* (2013.01)

(58) Field of Classification Search
CPC ................. F16H 2200/2012; F16H 2200/2048
See application file for complete search history.

(56) References Cited

U.S. PATENT DOCUMENTS

| | | | |
|---|---|---|---|
| 8,702,554 B2 | 4/2014 | Gumpoltsberger et al. |
| 8,858,387 B2 | 10/2014 | Haupt et al. |
| 8,939,863 B2 | 1/2015 | Hart et al. |
| 8,961,355 B2 | 2/2015 | Hart et al. |
| 9,050,882 B2 | 6/2015 | Mellet et al. |
| 9,193,346 B2 | 11/2015 | Tachibanada et al. |
| 9,255,627 B2 | 2/2016 | Shibamura et al. |

(Continued)

FOREIGN PATENT DOCUMENTS

| | | |
|---|---|---|
| JP | 4269832 B2 | 5/2009 |
| JP | 5155292 B2 | 6/2011 |

(Continued)

*Primary Examiner* — Tisha Lewis
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and seven friction elements disposed to selectively connect the rotation elements with each other and selectively connect the rotation elements with a transmission housing.

11 Claims, 2 Drawing Sheets

(56) References Cited

U.S. PATENT DOCUMENTS

| | | | |
|---|---|---|---|
| 9,556,937 B1* | 1/2017 | Kwon | F16H 3/66 |
| 2007/0202987 A1* | 8/2007 | Kakinami | B60K 6/40 |
| | | | 477/3 |
| 2012/0329600 A1 | 12/2012 | Park et al. | |
| 2013/0150204 A1 | 6/2013 | Park et al. | |
| 2013/0203550 A1 | 8/2013 | Mellet et al. | |
| 2016/0169332 A1 | 6/2016 | Cho et al. | |
| 2016/0319911 A1 | 11/2016 | Park et al. | |

FOREIGN PATENT DOCUMENTS

| | | |
|---|---|---|
| KR | 10-2012-0119451 A | 10/2012 |
| KR | 10-2013-0031453 A | 3/2013 |
| KR | 10-1394033 B1 | 5/2014 |

* cited by examiner

FIG. 2

| | Friction element | | | | | | | Gear ratio | Step ratio | Span of gear ratio |
|---|---|---|---|---|---|---|---|---|---|---|
| | B1 | B2 | B3 | C1 | C2 | C3 | C4 | | | |
| D1 | | ● | ● | | | | ● | 4.702 | | 9.837 |
| D2 | | | ● | | ● | | ● | 3.016 | 1.559 | |
| D3 | | ● | ● | | ● | | | 2.139 | 1.410 | |
| D4 | | ● | ● | | | ● | | 1.597 | 1.339 | |
| D5 | | ● | | | | ● | | 1.209 | 1.321 | |
| D6 | | | | | ● | ● | ● | 1.000 | 1.209 | |
| D7 | | ● | | | ● | ● | ● | 0.869 | 1.151 | |
| D8 | ● | | | | | ● | ● | 0.704 | 1.234 | |
| D9 | ● | ● | | | | ● | | 0.578 | 1.218 | |
| D10 | ● | | | ● | | ● | | 0.478 | 1.209 | |
| REV1 | ● | ● | ● | | | | | -4.106 | | |
| REV2 | ● | | ● | ● | | | | -4.665 | | |

PLANETARY GEAR TRAIN OF AUTOMATIC TRANSMISSION FOR A VEHICLE

CROSS-REFERENCE TO RELATED APPLICATION

The present application claims priority to Korean Patent Application No. 10-2015-0078001 filed Jun. 2, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train for an automatic transmission of a vehicle that improves power delivery performance and fuel efficiency as a consequence of achieving ten forward speed stages using a minimum number of constituent elements, enlarging a span of gear ratios, and almost linearly increasing or decreasing step ratios between transmission steps.

Description of Related Art

In recent years, increasing oil prices have forced auto manufacturers into extreme competition in order to enhance fuel efficiency.

As a result, research is being conducted on engines in terms of reducing weight and improving fuel efficiency by down-sizing, and research is also being conducted to ensure both drivability and competitiveness for maximizing fuel efficiency by implementing an automatic transmission with multiple speed stages.

However, in the automatic transmission, as a number of transmission speed stages increases, the number of internal components increases, and as a result, the automatic transmission may be difficult to mount, the manufacturing cost and weight may be increased, and power transmission efficiency may be deteriorated.

Accordingly, development of a planetary gear train which may bring about maximum efficiency with a small number of components may be important in order to increase a fuel efficiency enhancement effect through the multiple speed stages.

In this aspect, in recent years, 8-speed automated transmissions have tended to be achieved and the research and development of a planetary gear train capable of implementing more transmission steps has also been actively conducted.

Since a span of gear ratios of the recent 8-speed automatic transmission is merely 6.5 to 7.5, the 8-speed automatic transmission has no great effect of improving fuel efficiency.

In addition, since step ratios between transmission step may not be increased or decreased linearly in a case in which a span of shift ratios of the 8-speed automatic transmission is greater than or equal to 9.0, driving efficiency of an engine and drivability of a vehicle may be deteriorated. Accordingly, there is a need for development of a high efficient automatic transmission with 9 or more forward speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency by achieving ten forward speed stages and two reverse speed stages using a minimum number of constituent elements, by enlarging a span of gear ratios, and by almost linearly increasing or decreasing step ratios between transmission steps.

Various aspects of the present invention are directed to providing a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and seven friction elements disposed to selectively connect the rotation elements with each other and selectively connect the rotation elements with a transmission housing, in which the input shaft may be continuously connected to the first rotation element, the output shaft may be continuously connected to the eleventh rotation element, the second rotation element may be connected to the first rotation element, the third rotation element may be continuously connected to the fifth rotation element, the sixth rotation element may be continuously connected to the seventh rotation element, the sixth rotation element may be continuously connected to the tenth rotation element, the ninth rotation element may be continuously connected to the eleventh rotation element, and three friction elements among a seven friction elements are operated at each speed stage.

The second rotation element may be selectively connected to the transmission housing, the third rotation element may be selectively connected to the transmission housing, the fourth rotation element may be selectively connected to the output shaft, the sixth rotation element may be selectively connected to the second rotation element, the eighth rotation element may be selectively connected to the input shaft, and the twelfth rotation element may be selectively connected to the transmission housing.

The first, second, and third rotation elements of the first planetary gear set are a sun gear, a planet carrier, and a ring gear, the fourth, fifth, and sixth rotation elements of the second planetary gear set may be a sun gear, a planet carrier, and a ring gear, the seventh, eighth, and ninth rotation elements of the third planetary gear set may be a sun gear, a planet carrier, and a ring gear, and the tenth, eleventh, and twelfth rotation elements of the fourth planetary gear set may be a sun gear, a planet carrier, and a ring gear.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, seven friction elements disposed to selectively connect the rotation elements with each other and selectively connect the rotation elements with a transmission housing, a first rotation shaft including the first rotation element and directly connected to the input shaft, a second rotation shaft including the second rotation element and selectively connected to the first rotation shaft and the transmission housing, a third rotation shaft including the third and fifth rotation elements, a fourth rotation shaft including the fourth rotation element and selectively connected to the transmission housing, a fifth rotation shaft including the sixth, seventh, and tenth rotation elements and selectively connected to the second rotation shaft, a sixth rotation shaft including the eighth rotation element and selectively connected to the input shaft, a seventh rotation shaft including the ninth and eleventh rotation shafts and directly connected to the output shaft, and an eighth rotation shaft including the twelfth rotation element and selectively connected to the transmission housing.

The first planetary gear set may be a single-pinion planetary gear set, in which the first rotation element may be a first sun gear, the second rotation element may be a first planet carrier, and the third rotation element may be a first ring gear, the second planetary gear set may be a single-pinion planetary gear set, in which the fourth rotation element may be a second sun gear, the fifth rotation element may be a second planet carrier, and the sixth rotation element may be a second ring gear, the third planetary gear set may be a single-pinion planetary gear set, in which the seventh rotation element may be a third sun gear, the eighth rotation element may be a third planet carrier, and the ninth rotation element may be a third ring gear, and the fourth planetary gear set may be a single-pinion planetary gear set, the tenth rotation element may be a fourth sun gear, the eleventh rotation element may be a fourth planet carrier, and the twelfth rotation element may be a fourth ring gear.

The seven friction elements may include a first clutch selectively connecting the fourth and seventh rotation shafts, a second clutch selectively connecting the first and second rotation shafts, a third clutch selectively connecting the input shaft and the sixth rotation shaft, a fourth clutch selectively connecting the second and fifth rotation shafts, a first brake selectively connects the first rotation shaft and the transmission housing, a second brake selectively connects the fourth rotation shaft and the transmission housing, and a third brake selectively connects the eighth rotation shaft and the transmission housing.

Shift speed stages achieved by selectively operating the seven friction elements may include a first forward speed stage achieved by simultaneous operation of the fourth clutch and the second and third brakes, a second forward speed stage achieved by simultaneous operation of the second and fourth clutches and the third brake, a third forward speed stage achieved by simultaneous operation of the second clutch and the second and third brakes, a fourth forward speed stage achieved by simultaneous operation of the third clutch and the second and third brakes, a fifth forward speed stage achieved by simultaneous operation of the second and third clutches and the second brake, a sixth forward speed stage achieved by simultaneous operation of the second, third and fourth clutches, a seventh forward speed stage achieved by simultaneous operation of the third and fourth clutches and the second brake, an eighth forward speed stage achieved by simultaneous operation of the third and fourth clutches and the first brake, a ninth forward speed stage achieved by simultaneous operation of the third clutch and the first and second brakes, a tenth forward speed stage achieved by simultaneous operation of the first and third clutches and the first brake, a first reverse speed stage achieved by simultaneous operation of the first, second and third brakes, and a second reverse speed stage achieved by simultaneous operation of the first clutch and the first and third brakes.

The second rotation element may be selectively connected to the first rotation element, According to various aspects of the present invention, a planetary gear train of an automatic transmission for a vehicle may include an input shaft receiving torque of an engine, an output shaft outputting changed torque, a first planetary gear set including a first, second and third rotation elements, a second planetary gear set including a fourth, fifth and sixth rotation elements, a third planetary gear set including a seventh, eighth and ninth rotation elements, a fourth planetary gear set including a tenth, eleventh and twelfth rotation elements, a first rotation shaft including the first rotation element and directly connected to the input shaft, a second rotation shaft including the second rotation element and selectively connected to the first rotation shaft and the transmission housing, a third rotation shaft including the third and fifth rotation elements, a fourth rotation shaft including the fourth rotation element and selectively connected to the transmission housing, a fifth rotation shaft including the sixth, seventh, and tenth rotation elements and selectively connected to the second rotation shaft, a sixth rotation shaft including the eighth rotation element and selectively connected to the input shaft, a seventh rotation shaft including the ninth and eleventh rotation shafts and directly connected to the output shaft, an eighth rotation shaft including the twelfth rotation element and selectively connected to the transmission housing, a first clutch selectively connecting the fourth and seventh rotation shafts, a second clutch selectively connecting the first and second rotation shafts, a third clutch selectively connecting the input shaft and the sixth rotation shaft, a fourth clutch selectively connecting the second and fifth rotation shafts, a first brake selectively connecting the first rotation shaft and the transmission housing, a second brake selectively connecting the fourth rotation shaft and the transmission housing, and a third brake selectively connecting the eighth rotation shaft and the transmission housing.

Various embodiments of the present invention may achieve ten forward speed stages and two reverse speed stages by combining four planetary gear sets that are simple planetary gear sets with seven friction elements.

In addition, engine driving efficiency may be maximized by achieving a span of shift ratios to be greater than or equal to 9.0.

In addition, drivability such as acceleration before and after the shift and rhythm of engine speed may be improved by almost linearly increasing or decreasing step ratios between transmission steps.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective friction elements applied to the exemplary planetary gear train according to the present invention.

Figure 1:
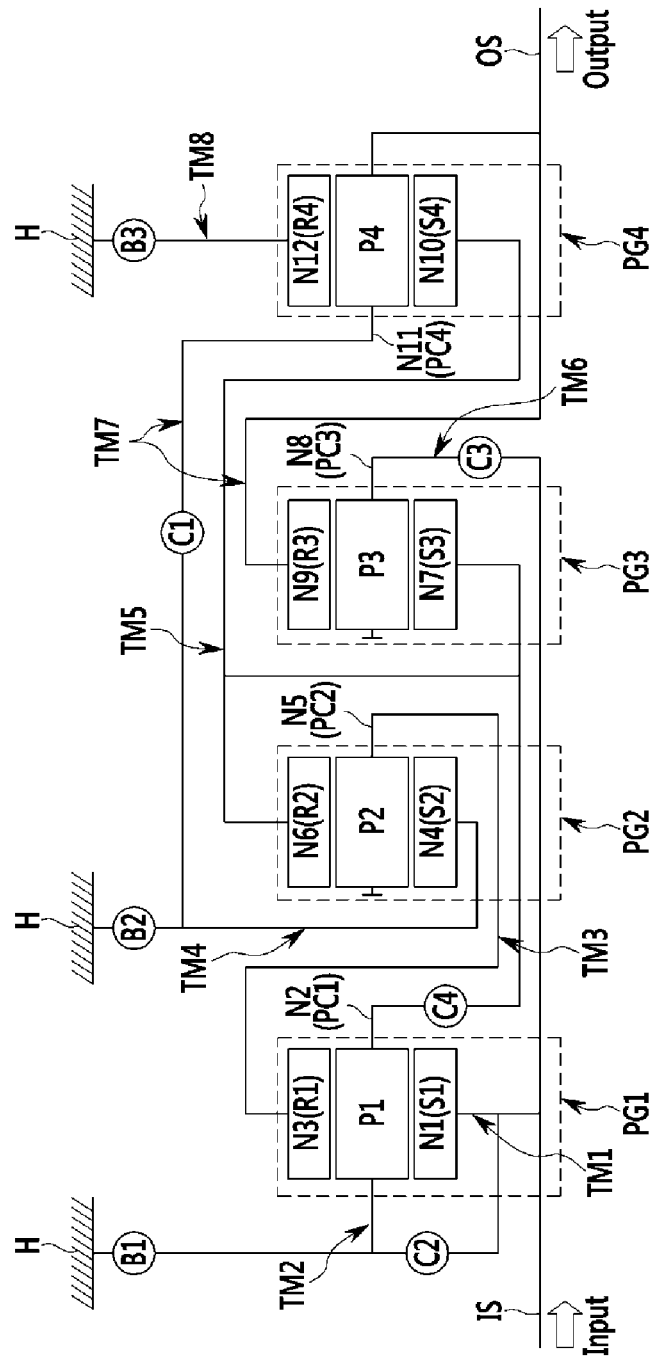
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention includes a first, second, third, and fourth planetary gear sets PG1, PG2, PG3, and PG4 disposed on the same axis, and an input shaft IS, an output shaft OS, eight rotation shafts TM1 to TM8 directly connecting to each other respective rotation elements of the first, second, third, and fourth planetary gear sets PG1, PG2, PG3, and PG4, seven friction elements C1 to C4 and B1 to B3, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the first, second, third, and fourth planetary gear sets PG1, PG2, PG3, and PG4 form an engine side.

The input shaft IS is an input member and rotational power from a crankshaft of an engine is torque-converted through a torque converter to be input into the input shaft IS.

The output shaft OS is an output member, is disposed on the same axis with the input shaft IS, and transfers transmitted driving torque to a driving shaft through a differential apparatus.

The first planetary gear set PG1 as a single-pinion planetary gear set includes a first sun gear S1 which is a first rotation element N1, a first planetary carrier PC1 which is a second rotation element N2 that supports a first pinion P1 which outer-engages with the first sun gear S1 which is the first rotation element N1, and a first ring gear R1 which is a third rotation element N3 which inner-engages with the first pinion P1 as rotation elements.

The second planetary gear set PG2 as a single-pinion planetary gear set includes a second sun gear S2 which is a fourth rotation element N4, a second planet carrier PC2 which is a fifth rotation element N5 that supports a second pinion P2 which outer-engages with the second sun gear S2 which is the fourth rotation element N4, and a second ring gear R2 which is a sixth rotation element N6 which inner-engages with the second pinion P2 as rotation elements.

The third planetary gear set PG3 as a single-pinion planetary gear set includes a third sun gear S3 which is a seventh rotation element N7, a third planet carrier PC3 which is an eighth rotation element N8 that supports a third pinion P3 which outer-engages with the third sun gear S3 which is the seventh rotation element N7, and a third ring gear R3 which is a ninth rotation element N9 which inner-engages with the third pinion P3 as the rotation elements.

The fourth planetary gear set PG4 as a single-pinion planetary gear set includes a fourth sun gear S4 which is a tenth rotation element N10, a fourth planet carrier PC4 which is an eleventh rotation element N11 that supports a fourth pinion P4 which outer-engages with the fourth sun gear S4 which is the tenth rotation element N10, and a fourth ring gear R4 which is a twelfth rotation element N12 which inner-engages with the fourth pinion P4 as the rotation elements.

In the first, second, third, and fourth planetary gear sets PG1, PG2, PG3, and PG4, the third rotation element N3 is directly connected to the fifth rotation element N5, the sixth rotation element N6 is directly connected to the seventh and tenth rotation elements N7 and N10, and the ninth rotation element N9 is directly connected to the eleventh rotation element N11 so as to be operated with a total of eight rotation shafts TM1 to TM8.

Configurations of the eight rotation shafts TM1 to TM8 will be described below.

The first rotation shaft TM1 includes the first rotation element N1 (the first sun gear S1) and is directly connected to the input shaft IS so as to be continuously operated as an input element.

The second rotation shaft TM2 includes the second rotation element N2 (the first planet carrier PC1) and is selectively connected to the first rotation shaft TM1 and the transmission housing H.

The third rotation shaft TM3 includes the third rotation element N3 (the first ring gear R1) and the fifth rotation element N5 (the second planet carrier PC2).

The fourth rotation shaft TM4 includes the fourth rotation element N4 (the second sun gear S2) and is selectively connected to the transmission housing H.

The fifth rotation shaft TM5 includes the sixth rotation element N6 (the second ring gear R2) and the seventh rotation element N7 (the third sun gear S3) and tenth rotation element N10 (the fourth sun gear S4), and is selectively connected to the second rotation shaft TM2.

The sixth rotation shaft TM6 includes the eighth rotation element N8 (the third planet carrier PC3) and is selectively connected to the input shaft IS.

The seventh rotation shaft TM7 includes ninth rotation element N9 (the third ring gear R3) and the eleventh rotation element N11 (the fourth planet carrier PC4) and is selectively connected to the fourth rotation shaft TM4, and is directly connected to the output shaft OS.

The eighth rotation shaft TM8 includes the twelfth rotation element N12 (the fourth ring gear R4) and is selectively connected to the transmission housing H.

In addition, among the rotation shafts TM1 to TM8, four clutches C1, C2, C3, and C4 which are friction elements are disposed at connection portions where the rotation shafts are connected to each other.

In addition, among the rotation shafts TM1 to TM8, three brakes B1, B2 and B3 which are friction elements are disposed at connection portions between any one rotation shaft and the transmission housing H.

The seven friction elements C1 to C4 and B1 to B3 will be described in further detail.

The first clutch C1 is disposed between fourth rotation shaft TM4 and the seventh rotation shaft TM7 and selectively connects the fourth rotation shaft TM4 and the seventh rotation shaft TM7.

The second clutch C2 is disposed between first rotation shaft TM1 and the second rotation shaft TM2 and selectively connects the first rotation shaft TM1 and the second rotation shaft TM2.

The third clutch C3 is disposed between input shaft IS and the sixth rotation shaft TM6 and selectively connects the input shaft IS and the sixth rotation shaft TM6.

The fourth clutch C4 is disposed between second rotation shaft TM2 and the fifth rotation shaft TM5 and selectively connects the second rotation shaft TM2 and the fifth rotation shaft TM5.

The first brake B1 is disposed between second rotation shaft TM2 and the transmission housing H and causes the second rotation shaft TM2 to be operated as a selective fixed element.

The second brake B2 is disposed between fourth rotation shaft TM4 and the transmission housing H and causes the fourth rotation shaft TM4 to be operated as a selective fixed element.

The third brake B3 is disposed between eighth rotation shaft TM8 and the transmission housing H and causes the eighth rotation shaft TM8 to be operated as a selective fixed element.

The friction elements including the first, second, third, and fourth clutches C1, C2, C3, and C4 and the first, second, and third brakes B1, B2, and B3 may be multi-plate friction elements of a wet type that are operated by hydraulic pressure.

FIG. 2 is an operation chart of friction elements at each speed stage in the planetary gear train according to various embodiments of the present invention.

As shown in FIG. 2, three friction elements are operated at each speed stage in the planetary gear train according to various embodiments of the present invention. Shifting processes in the various embodiments of the present invention will be described in further detail.

The fourth clutch C4 and the second and third brakes B2 and B3 are simultaneously operated at a first forward speed stage D1. In a state that the second rotation shaft TM2 is connected to the fifth rotation shaft TM5 by operation of the fourth clutch C4 and the input is made into the first rotation shaft TM1, and the fourth and eighth rotation shaft TM4 and TM8 are operated as the fixed elements by operation of the second and third brakes B2 and B3. Therefore, the first forward speed stage D1 is achieved.

The second and fourth clutches C2 and C4 and the third brake B3 are simultaneously operated at a second forward speed stage D2. In a state that the second rotation shaft TM2 is connected to the first and fifth rotation shafts TM1 and TM5 by operation of the second and fourth clutches C2 and C4 and the input is made into the first rotation shaft TM1, and the eighth rotation shaft TM8 is operated as the fixed element by operation of the third brake B3. Therefore, second forward speed stage D2 is achieved.

The second clutch C2 and the second and third brakes B2 and B3 are simultaneously operated at a third forward speed stage D3. In a state that the first rotation shaft TM1 is connected to the second rotation shaft TM2 by operation of the second clutch C2 and the input is made into the first rotation shaft TM1, and the fourth and eighth rotation shafts TM4 and TM8 are operated as the fixed element by operation of the second and third brakes B2 and B3. Therefore, the third forward speed stage D3 is achieved.

The third clutch C3 and the second and third brakes B2 and B3 are simultaneously operated at a fourth forward speed stage D4. In a state that the input shaft IS is connected to the sixth rotation shaft TM6 by operation of the third clutch C3 and the input is made into the first and sixth rotation shafts TM1 and TM6, and the fourth and eighth rotation shafts TM4 and TM8 are operated as the fixed elements by operation of the second and third brakes B2 and B3. Therefore, the fourth forward speed stage D4 is achieved.

The second and third clutches C2 and C3 and the second brake B2 are simultaneously operated at a fifth forward speed stage D5. In a state that the first rotation shaft TM1 is connected to the second rotation shaft TM2 by operation of the second clutch C2 and the input shaft IS is connected to the sixth rotation shaft TM6 by operation of the third clutch C3 and the input is made into the first and sixth rotation shafts TM1 and TM6, and the fourth rotation shaft TM4 is operated as the fixed element by operation of the second brake B2. Therefore, the fifth forward speed stage D5 is achieved.

The second, third, and fourth clutches C2, C3, and C4 are simultaneously operated at a sixth forward speed stage D6. In a state that the second rotation shaft TM2 is connected to the first and fifth rotation shafts TM1 and TM5 by operation of the second and fourth clutches C2 and C4, and the input shaft IS is connected to the sixth rotation shaft TM6 by operation of the third clutch C3. Therefore, the sixth forward speed stage D6 for just outputting the input is achieved as all of the first, second, third, and fourth planetary gear sets PG1, PG2, PG3, and PG4 are integrally rotate at the same speed.

The third and fourth clutches C3 and C4 and the second brake B2 are simultaneously operated at a seventh forward speed stage D7. In a state that the input shaft IS is connected to the sixth rotation shaft TM6 by operation of the third clutch C3 and the second rotation shaft TM2 is connected to the fifth rotation shaft TM5 by operation of the fourth clutch C4 and the input is made into the first and sixth rotation shafts TM1 and TM6, and the fourth rotation shaft TM4 is operated as the fixed element by operation of the second brake B2. Therefore, the seventh forward speed stage D7 is achieved.

The third and fourth clutches C3 and C4 and the first brake B1 are simultaneously operated at an eighth forward speed stage D8. In a state that the input shaft IS is connected to the sixth rotation shaft TM6 by operation of the third clutch C3 and the second rotation shaft TM2 is connected to the fifth rotation shaft TM5 by operation of the fourth clutch C4 and the input is made into the first and sixth rotation shafts TM1 and TM6, and the second rotation shaft TM2 is operated as the fixed element by operation of the first brake B1. Therefore, the eighth forward speed stage D8 is achieved.

The third clutch C3 and the first and second brake B1 and B2 are simultaneously operated at a ninth forward speed stage D9. In a state that the input shaft IS is connected to the sixth rotation shaft TM6 by operation of the third clutch C3 and the input is made into the first and sixth rotation shafts TM1 and TM6, and the second and fourth rotation shafts TM2 and TM4 are operated as the fixed elements by operation of the first and second brake B1 and B2. Therefore, the ninth forward speed stage D9 is achieved.

The first and third clutches C1 and C3 and the first brake B1 are simultaneously operated at a tenth forward speed stage D10. In a state that the fourth rotation shaft TM4 is connected to the seventh rotation shaft TM7 by operation of the first clutch C1 and the input shaft IS is connected to the sixth rotation shaft TM6 by operation of the third clutch C3 and the input is made into the first and sixth rotation shafts TM1 and TM6, and the second rotation shaft TM2 is operated as the fixed element by operation of the first brake B1. Therefore, the tenth forward speed stage D10 is achieved.

The first, second and third brakes B1, B2, and B3 are simultaneously operated at a first reverse speed stage REV1. In a state that the input is made into the first rotation shaft TM1 and the second, fourth and eighth rotation shafts TM2, TM4, and TM8 are operated as the fixed elements by operation of the first, second and third brakes B1, B2, and B3. Therefore, the first reverse speed stage REV1 is achieved.

The first and third brakes B1 and B3 and the first clutch C1 are simultaneously operated at a second reverse speed stage REV2. In a state that the fourth rotation shaft TM4 is connected to the seventh rotation shaft TM7 by operation of the first clutch C1 and the input is made into the first rotation shaft TM1, and the second and eighth rotation shafts TM2 and TM8 are operated as the fixed elements by operation of the first and second brakes B1 and B2. Therefore, the second reverse speed stage REV2 is achieved.

The planetary gear train according to various embodiments of the present invention may achieve ten forward speed stages and two reverse speed stages by control of four planetary gear sets PG1, PG2, PG3, and PG4 with four clutches C1, C2, C3, and C4, and three brakes B1, B2 and B3.

In addition, engine driving efficiency may be maximized by achieving a span of shift ratios to be greater than or equal to 9.0.

In addition, drivability such as acceleration before and after the shift and rhythm of engine speed may be improved by almost linearly increasing or decreasing step ratios between transmission steps.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque of the engine;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements; and
   seven friction elements disposed to selectively connect the rotation elements with each other and selectively connect the rotation elements with a transmission housing,
   wherein the input shaft is continuously connected to the first rotation element,
   the output shaft is continuously connected to the eleventh rotation element,
   the second rotation element is connected to the first rotation element,
   the third rotation element is continuously connected to the fifth rotation element,
   the sixth rotation element is continuously connected to the seventh rotation element,
   the sixth rotation element is continuously connected to the tenth rotation element,
   the ninth rotation element is continuously connected to the eleventh rotation element, and
   three friction elements among a seven friction elements are operated at each speed stage.

2. The planetary gear train of claim 1, wherein:
   the second rotation element is selectively connected to the transmission housing,
   the third rotation element is selectively connected to the transmission housing,
   the fourth rotation element is selectively connected to the output shaft,
   the sixth rotation element is selectively connected to the second rotation element,
   the eighth rotation element is selectively connected to the input shaft, and
   the twelfth rotation element is selectively connected to the transmission housing.

3. The planetary gear train of claim 1, wherein:
   the first, second, and third rotation elements of the first planetary gear set are a sun gear, a planet carrier, and a ring gear,
   the fourth, fifth, and sixth rotation elements of the second planetary gear set are a sun gear, a planet carrier, and a ring gear,
   the seventh, eighth, and ninth rotation elements of the third planetary gear set are a sun gear, a planet carrier, and a ring gear, and
   the tenth, eleventh, and twelfth rotation elements of the fourth planetary gear set are a sun gear, a planet carrier, and a ring gear.

4. A planetary gear train of an automatic transmission for a vehicle, comprising:
   an input shaft receiving torque of an engine;
   an output shaft outputting changed torque of the engine;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;
   seven friction elements disposed to selectively connect the rotation elements with each other and selectively connect the rotation elements with a transmission housing;
   a first rotation shaft including the first rotation element and directly connected to the input shaft;
   a second rotation shaft including the second rotation element and selectively connected to the first rotation shaft and the transmission housing;
   a third rotation shaft including the third and fifth rotation elements;

a fourth rotation shaft including the fourth rotation element and selectively connected to the transmission housing;
a fifth rotation shaft including the sixth, seventh, and tenth rotation elements and selectively connected to the second rotation shaft;
a sixth rotation shaft including the eighth rotation element and selectively connected to the input shaft;
a seventh rotation shaft including the ninth and eleventh rotation shafts and directly connected to the output shaft; and
an eighth rotation shaft including the twelfth rotation element and selectively connected to the transmission housing.

5. The planetary gear train of claim 4, wherein
the first planetary gear set is a single-pinion planetary gear set, in which the first rotation element is a first sun gear, the second rotation element is a first planet carrier, and the third rotation element is a first ring gear,
the second planetary gear set is a single-pinion planetary gear set, in which the fourth rotation element is a second sun gear, the fifth rotation element is a second planet carrier, and the sixth rotation element is a second ring gear,
the third planetary gear set is a single-pinion planetary gear set, in which the seventh rotation element is a third sun gear, the eighth rotation element is a third planet carrier, and the ninth rotation element is a third ring gear, and
the fourth planetary gear set is a single-pinion planetary gear set, the tenth rotation element is a fourth sun gear, the eleventh rotation element is a fourth planet carrier, and the twelfth rotation element is a fourth ring gear.

6. The planetary gear train of claim 4, wherein the seven friction elements comprise:
a first clutch selectively connecting the fourth and seventh rotation shafts;
a second clutch selectively connecting the first and second rotation shafts;
a third clutch selectively connecting the input shaft and the sixth rotation shaft;
a fourth clutch selectively connecting the second and fifth rotation shafts;
a first brake selectively connects the second rotation shaft and the transmission housing;
a second brake selectively connects the fourth rotation shaft and the transmission housing; and
a third brake selectively connects the eighth rotation shaft and the transmission housing.

7. The planetary gear train of claim 6, wherein shift speed stages achieved by selectively operating the seven friction elements comprise:
a first forward speed stage achieved by simultaneous operation of the fourth clutch and the second and third brakes;
a second forward speed stage achieved by simultaneous operation of the second and fourth clutches and the third brake;
a third forward speed stage achieved by simultaneous operation of the second clutch and the second and third brakes;
a fourth forward speed stage achieved by simultaneous operation of the third clutch and the second and third brakes;
a fifth forward speed stage achieved by simultaneous operation of the second and third clutches and the second brake;
a sixth forward speed stage achieved by simultaneous operation of the second, third and fourth clutches;
a seventh forward speed stage achieved by simultaneous operation of the third and fourth clutches and the second brake;
an eighth forward speed stage achieved by simultaneous operation of the third and fourth clutches and the first brake;
a ninth forward speed stage achieved by simultaneous operation of the third clutch and the first and second brakes;
a tenth forward speed stage achieved by simultaneous operation of the first and third clutches and the first brake;
a first reverse speed stage achieved by simultaneous operation of the first, second and third brakes; and
a second reverse speed stage achieved by simultaneous operation of the first clutch and the first and third brakes.

8. The planetary gear train of claim 1, wherein the second rotation element is selectively connected to the first rotation element.

9. A planetary gear train of an automatic transmission for a vehicle, comprising:
an input shaft receiving torque of an engine;
an output shaft outputting changed torque;
a first planetary gear set including a first, second and third rotation elements;
a second planetary gear set including a fourth, fifth and sixth rotation elements;
a third planetary gear set including a seventh, eighth and ninth rotation elements;
a fourth planetary gear set including a tenth, eleventh and twelfth rotation elements;
a first rotation shaft including the first rotation element and directly connected to the input shaft;
a second rotation shaft including the second rotation element and selectively connected to the first rotation shaft and the transmission housing;
a third rotation shaft including the third and fifth rotation elements;
a fourth rotation shaft including the fourth rotation element and selectively connected to the transmission housing;
a fifth rotation shaft including the sixth, seventh, and tenth rotation elements and selectively connected to the second rotation shaft;
a sixth rotation shaft including the eighth rotation element and selectively connected to the input shaft;
a seventh rotation shaft including the ninth and eleventh rotation shafts and directly connected to the output shaft;
an eighth rotation shaft including the twelfth rotation element and selectively connected to the transmission housing;
a first clutch selectively connecting the fourth and seventh rotation shafts;
a second clutch selectively connecting the first and second rotation shafts;
a third clutch selectively connecting the input shaft and the sixth rotation shaft;
a fourth clutch selectively connecting the second and fifth rotation shafts;
a first brake selectively connecting the second rotation shaft and the transmission housing;
a second brake selectively connecting the fourth rotation shaft and the transmission housing; and a third brake selectively connecting the eighth rotation shaft and the transmission housing.

10. The planetary gear train of claim 9, wherein:

the first planetary gear set is a single-pinion planetary gear set, in which the first rotation element is a first sun gear, the second rotation element is a first planet carrier, and the third rotation element is a first ring gear, the second planetary gear set is a single-pinion planetary gear set, in which the fourth rotation element is a second sun gear, the fifth rotation element is a second planet carrier, and the sixth rotation element is a second ring gear, the third planetary gear set is a single-pinion planetary gear set, in which the seventh rotation element is a third sun gear, the eighth rotation element is a third planet carrier, and the ninth rotation element is a third ring gear, and the fourth planetary gear set is a single-pinion planetary gear set, the tenth rotation element is a fourth sun gear, the eleventh rotation element is a fourth planet carrier, and the twelfth rotation element is a fourth ring gear.

11. The planetary gear train of claim 9, wherein shift speed stages achieved by selectively operating the first, second, third, and fourth clutches and the first, second, and third brakes comprise:

a first forward speed stage achieved by simultaneous operation of the fourth clutch and the second and third brakes;

a second forward speed stage achieved by simultaneous operation of the second and fourth clutches and the third brake;

a third forward speed stage achieved by simultaneous operation of the second clutch and the second and third brakes;

a fourth forward speed stage achieved by simultaneous operation of the third clutch and the second and third brakes;

a fifth forward speed stage achieved by simultaneous operation of the second and third clutches and the second brake;

a sixth forward speed stage achieved by simultaneous operation of the second, third and fourth clutches;

a seventh forward speed stage achieved by simultaneous operation of the third and fourth clutches and the second brake;

an eighth forward speed stage achieved by simultaneous operation of the third and fourth clutches and the first brake;

a ninth forward speed stage achieved by simultaneous operation of the third clutch and the first and second brakes;

a tenth forward speed stage achieved by simultaneous operation of the first and third clutches and the first brake;

a first reverse speed stage achieved by simultaneous operation of the first, second and third brakes; and a second reverse speed stage achieved by simultaneous operation of the first clutch and the first and third brakes.

* * * * *